(12) United States Patent
Russell (10) Patent No.: US 8,163,362 B2
(45) Date of Patent: Apr. 24, 2012

(54) LINE OF SIGHT HOSE COVER

(75) Inventor: Timothy M. Russell, Anniston, AL (US)

(73) Assignee: YKK Corporation of America, Marietta, GA (US)

(*) Notice: Subject to any disclaimer, the term of this patent is extended or adjusted under 35 U.S.C. 154(b) by 0 days.

(21) Appl. No.: 12/767,149

(22) Filed: Apr. 26, 2010

(65) Prior Publication Data

US 2010/0203268 A1    Aug. 12, 2010

Related U.S. Application Data

(63) Continuation-in-part of application No. 12/040,596, filed on Feb. 29, 2008.

(51) Int. Cl.
*B32B 1/08* (2006.01)
*D03D 3/02* (2006.01)

(52) U.S. Cl. .................... 428/36.1; 139/387 R (58) Field of Classification Search .......... 442/203–206; 428/36.1, 36.3; 139/387 R See application file for complete search history.

(56) References Cited

U.S. PATENT DOCUMENTS

| | | | |
|---|---|---|---|
| 3,623,513 A | 11/1971 | Dinkelkamp | |
| 3,799,440 A | 3/1974 | Goss et al. | |
| 3,831,635 A | 8/1974 | Burton | |
| 4,174,739 A | 11/1979 | Rasero et al. | |
| 4,345,624 A | 8/1982 | Rider | |
| 4,349,049 A | 9/1982 | Silvey | |
| 4,445,332 A | 5/1984 | Thies et al. | |
| 4,446,607 A | 5/1984 | Merritt et al. | |
| 4,585,035 A | 4/1986 | Piccoli | |
| 4,688,605 A | 8/1987 | Eisenzimmer et al. | |
| 4,944,258 A | 7/1990 | Knutson et al. | |
| 5,042,515 A | 8/1991 | Boczkiewicz | |
| 5,244,016 A | 9/1993 | Kuroda et al. | |
| 5,273,080 A * | 12/1993 | Morohashi et al. | 139/388 |
| 5,361,806 A | 11/1994 | Lalikos et al. | |
| 5,762,108 A | 6/1998 | Hunter et al. | |
| 5,843,542 A | 12/1998 | Brushafer et al. | |
| 5,895,076 A | 4/1999 | Elliott | |
| 6,085,796 A | 7/2000 | Riga | |
| 6,446,671 B2 | 9/2002 | Armenia et al. | |

(Continued)

FOREIGN PATENT DOCUMENTS

EP    0214835    3/1987

(Continued)

OTHER PUBLICATIONS

Textronik Industries website: www.textronik.com/electronics/batch_counter.htm.*

(Continued)

*Primary Examiner* — Rena Dye
*Assistant Examiner* — Susan R Dye
(74) *Attorney, Agent, or Firm* — Kilpatrick Townsend & Stockton LLP (57) ABSTRACT

A multilayer hose cover for a hose, such as a high-pressure hose, is disclosed. In some embodiments, the hose cover comprises at least three layers that are interwoven together using weft yarn. In these embodiments, the hose cover includes an outer sheath, a middle sheath, and an inner sheath interwoven together by weft yarn in such a way that the layers reinforce one another and are configured to contain the energy associated with a hose burst.

20 Claims, 9 Drawing Sheets

U.S. PATENT DOCUMENTS

| | | |
|---|---|---|
| 6,688,338 B2 | 2/2004 | Meli et al. |
| 6,777,051 B1 * | 8/2004 | Mazzer .................. 428/36.1 |
| 6,817,082 B2 | 11/2004 | Grepaly et al. |
| 7,178,559 B2 | 2/2007 | Tielemans et al. |
| 2005/0051226 A1 | 3/2005 | D'Amico |
| 2009/0105753 A1 | 4/2009 | Greenhalgh et al. |
| 2009/0220716 A1 | 9/2009 | Russell |

FOREIGN PATENT DOCUMENTS

| | | |
|---|---|---|
| EP | 0481772 | 4/1992 |
| FR | 2583072 | 12/1986 |
| JP | 63-196889 U | 12/1988 |
| JP | 04-074788 U | 6/1992 |
| JP | 3051400 | 3/2000 |
| JP | 2000-130638 | 5/2000 |
| KR | 20-0242178 | 7/2001 |
| WO | WO2009/111100 A1 | 9/2009 |

OTHER PUBLICATIONS

International Search Report and Written Opinion for PCT/US2009/031145 dated Jul. 31, 2009.

Non-Final Office Action mailed from the U.S. Patent and Trademark Office on Apr. 13, 2011 in U.S. Appl. No. 12/040,596; 15 pages.

Response to Non-Final Office Action filed in the U.S. Patent and Trademark Office on Jun. 22, 2011 in U.S. Appl. No. 12/040,596; 16 pages.

Non-Final Office Action mailed on Apr. 13, 2011 in U.S. Appl. No. 12/040,596, 15 pages.

European Search Report and Written Opinion in European Patent Application No. EP 09716844, Aug. 18, 2010.

PCT/US2011/027500, "International Search Report and Written Opinion," 11 pages, Dec. 21, 2011.

* cited by examiner

LINE OF SIGHT HOSE COVER

CROSS-REFERENCE TO RELATED APPLICATIONS

This application is a continuation-in-part application of U.S. application Ser. No. 12/040,596 filed Feb. 29, 2008 entitled "Line of Sight Hose Cover," the contents of which are incorporated herein by this reference.

FIELD OF THE INVENTION

Embodiments of the present invention generally relate to hose covers, and more specifically, to hose covers designed for high-pressure hoses.

BACKGROUND OF THE INVENTION

High-pressure hoses present a danger to persons located in surrounding areas. High-pressure hoses, for example hydraulic hoses located on machinery, present a danger to persons around the machinery that are exposed if the hose fails under high pressure.

Typically, a high-pressure hose has two modes of failure: a catastrophic burst/rupture or a pin hole failure. When the hose undergoes a catastrophic burst failure, a large area of the hose fails. This type of failure is typically explosive, as the hose releases a large amount of fluid under high pressure. Persons in the area surrounding the hose may have fluid sprayed on them, and such fluid could be extremely hot or toxic. In some instances, the high-pressure hose includes a metal jacket or outer covering. During the rupture of the hose, pieces of the hose may be ejected at high speeds, turning into shrapnel having the potential to injure persons in the area.

In the pin hole mode of failure, the hose may develop a small hole in the wall of the high-pressure hose. The remainder of the hose remains intact and the fluid maintains a relatively high pressure within the hose. A high pressure jet of fluid is formed when fluid escapes from the hose through the pin hole at very high pressure. The high pressure jet has the potential to severely injure surrounding persons. For example, the fluid escaping from a pin hole can cause amputation of body parts and/or can puncture the skin and inject the fluid under the skin. The fluid injected under the skin, which may be oil, can cause severe injury, blood poisoning, and/or require amputation of the affected body parts. Further, the fluid jet is capable of puncturing protective garments such as gloves.

Thus, there is a need to protect persons in the area of a high-pressure hose from catastrophic ruptures, pin hole failures, and other failures of high-pressure hoses.

SUMMARY OF THE INVENTION

This invention relates to a hose cover for a hose, such as a high-pressure hose. In some embodiments, the hose cover includes a plurality of sheaths that are interwoven together using weft yarn. In some embodiments, the hose cover includes a first and a sixth layer that together form an outer sheath, a second and fifth layer that together form a middle sheath, and a third and fourth layer that together form an inner sheath. In these embodiments, the six layers are interwoven together using weft yarn in such a way that the layers reinforce one another and are configured to contain the energy associated with a hose burst. In other embodiments, more or less layers are interwoven together to form the hose cover.

BRIEF DESCRIPTION OF THE DRAWINGS

The present invention will now be described, by way of example only, with reference to the accompanying drawings, in which.

DETAILED DESCRIPTION OF THE EMBODIMENTS

Figure 1:
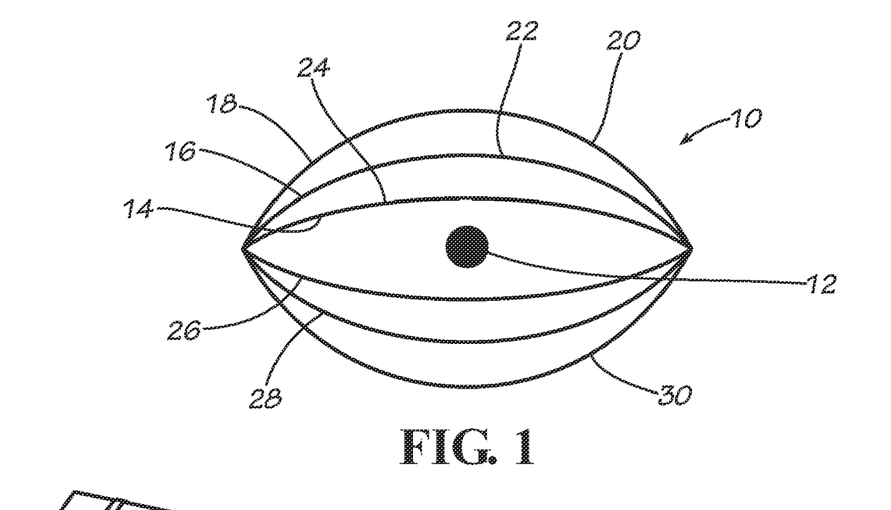
FIG. 1 is a cross-sectional view of a hose cover, positioned with respect to a hose, according to one embodiment of the invention.

FIGS. 1-13 illustrate a hose cover 10 according to an embodiment of the invention. As shown in FIG. 1, hose cover 10 comprises an inner sheath 14, a middle sheath 16, and an outer sheath 18. Hose cover 10 can be thought to have a first layer 20, a second layer 22, a third layer 24, a fourth layer 26, a fifth layer 28, and a sixth layer 30. First layer 20 and sixth layer 30 together form the outer sheath 18. Alternatively, outer sheath 18 can be thought to have a top layer 20 and a bottom layer 30. Second layer 22 and fifth layer 28 together form the middle sheath 16. Alternatively, middle sheath 16 can be thought to have a top layer 22 and a bottom layer 28. Third layer 24 and fourth layer 26 together form the inner sheath 14. Alternatively, inner sheath 14 can be thought to have a top layer 24 and a bottom layer 26.

In use, a hose 12, such as a high-pressure hose, is disposed between an opening formed between the third layer 24 and the fourth layer 26 of the inner sheath 14. As shown in FIG. 1, the inner sheath 14, the middle sheath 16, and the outer sheath 18 all surround the hose 12.

Each of the inner sheath 14, the middle sheath 16, and the outer sheath 18 have a woven construction formed through the weaving of yarns. The yarns may comprise a number of different materials, such as synthetic materials including nylon, polyester, and Kevlar™. Other materials may be selected depending on the type of fluid circulating in the hose 12 or the operating environment in which the hose cover 10 will be used. For example, the material may be selected to help prevent the material of the hose cover 10 from being degraded by the fluid or the environment in which the hose cover 10 will be used.

Figure 3:
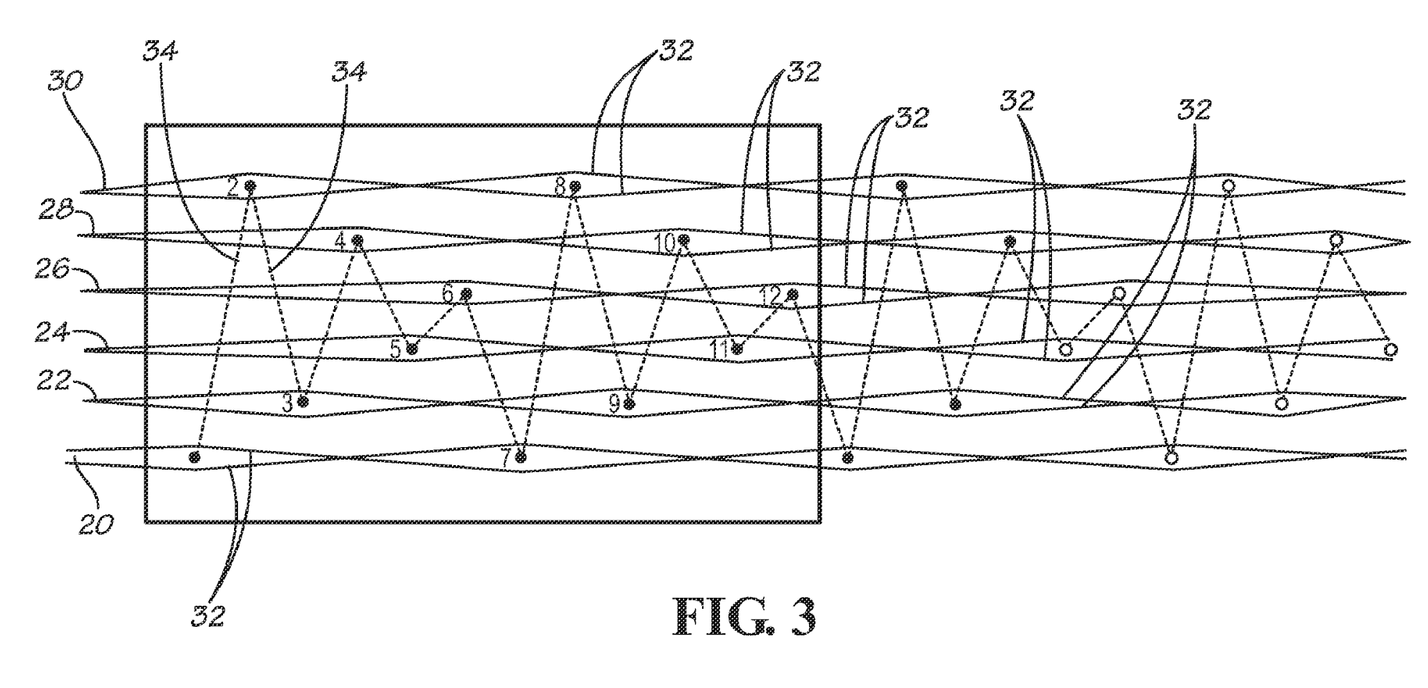
FIG. 3 is a cross-sectional view of the weaving pattern of the hose cover of FIG. 1.

As shown in FIG. 3, each of the first layer 20, the second layer 22, the third layer 24, the fourth layer 26, the fifth layer 28, and the sixth layer 30 comprise a plurality of warp yarns 32 extending in a generally longitudinal direction. As described further below, the hose cover 10 is formed with the simultaneous weaving of the warp yarns 32 of the six layers. Weft yarn 34 (also referred to as "pick" yarn or "lateral" yarn), which extends in a generally latitudinal direction in the hose cover 10, is woven between the warp yarns 32 in a pattern such that all six layers are interwoven together, and the weft yarn is shared between all six layers. In some embodiments, the weft yarn can be approximately 840 denier polyester yarn. In other embodiments, the weft yarn can be industrial filament polyester yarn, nylon, Nomex™, Kevlar™, or any other suitable yarn.

Figure 2:
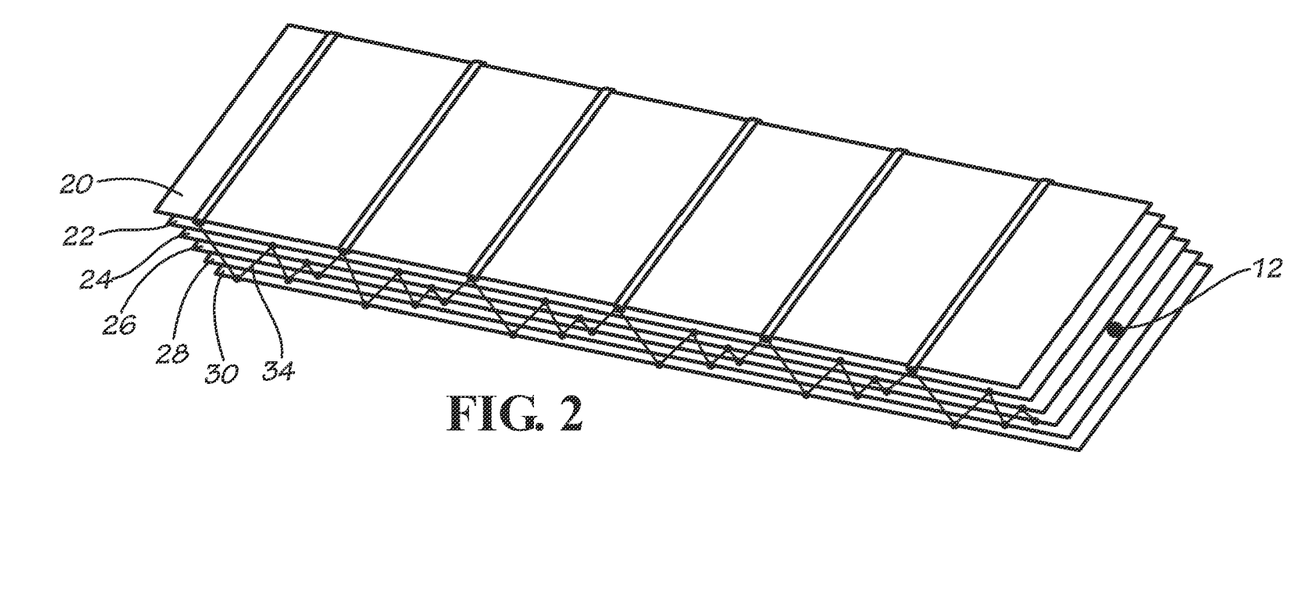
FIG. 2 is a perspective view illustrating the weaving pattern used to form the hose cover of FIG. 1.

FIGS. 2 and 3 illustrate the weaving pattern of the six layers. As illustrated in FIG. 3, each layer comprises a plurality of warp yarns 32. As shown in FIGS. 2-3, weft yarn 34 is woven in a weft direction with the warp yarns 32 so that the six layers are interwoven with each other.

Figure 4:
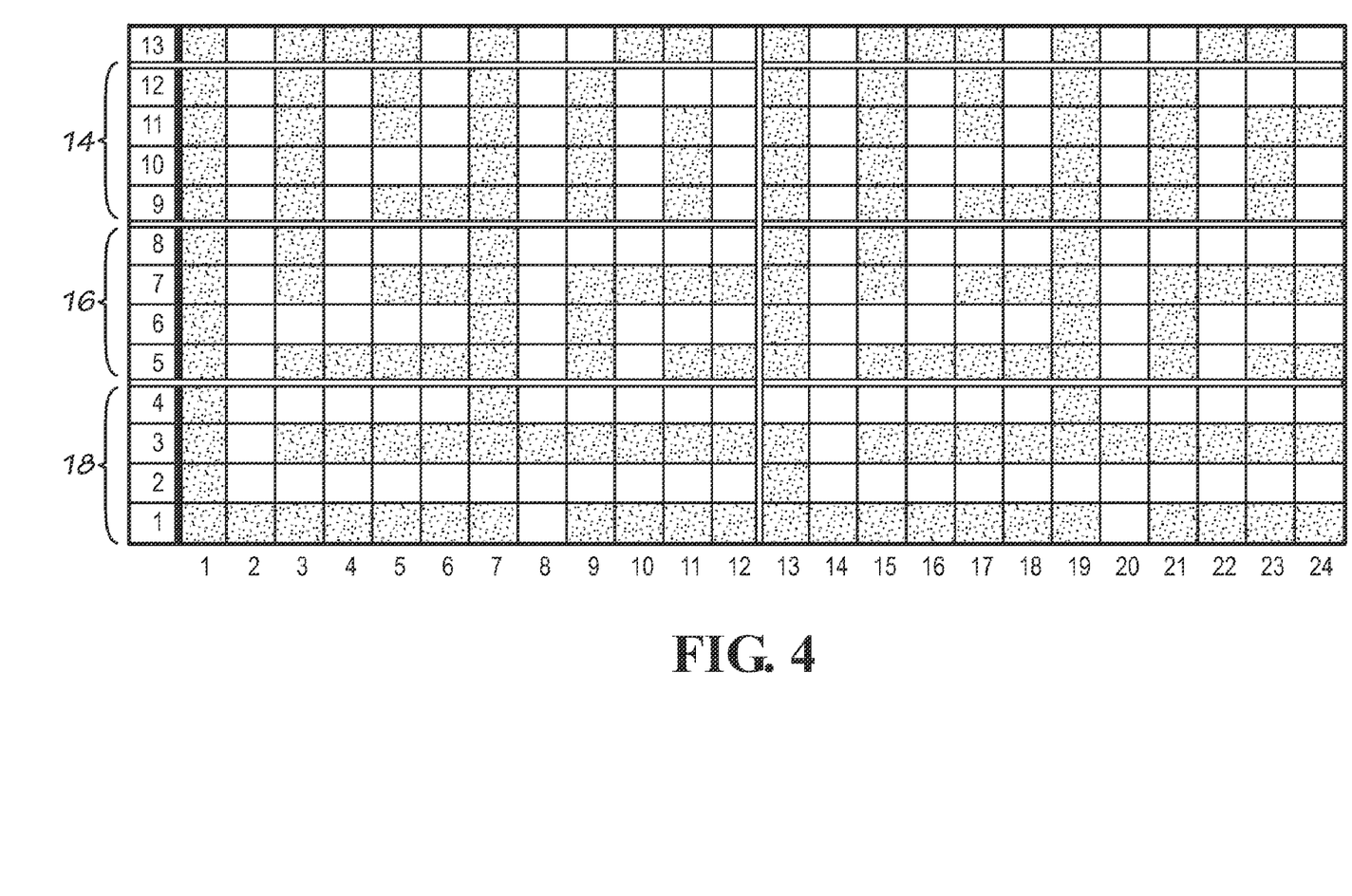
FIG. 4 is a pick diagram of the weaving pattern of the hose cover of FIG. 1.

FIG. 4 is a pick diagram (also known as a chain diagram or cam draft) for the hose structure 10. The horizontal rows of squares represent the weaving path/throw of the weft yarn, and the vertical columns, which correspond to harnesses of a loom, represent groups of warp yarns. The pick diagram of FIG. 4 shows a thirteen harness loom. When a square is shaded, it indicates that the harness corresponding to that square is lifted as the weft yarn is thrown across the loom.

Figure 5A:
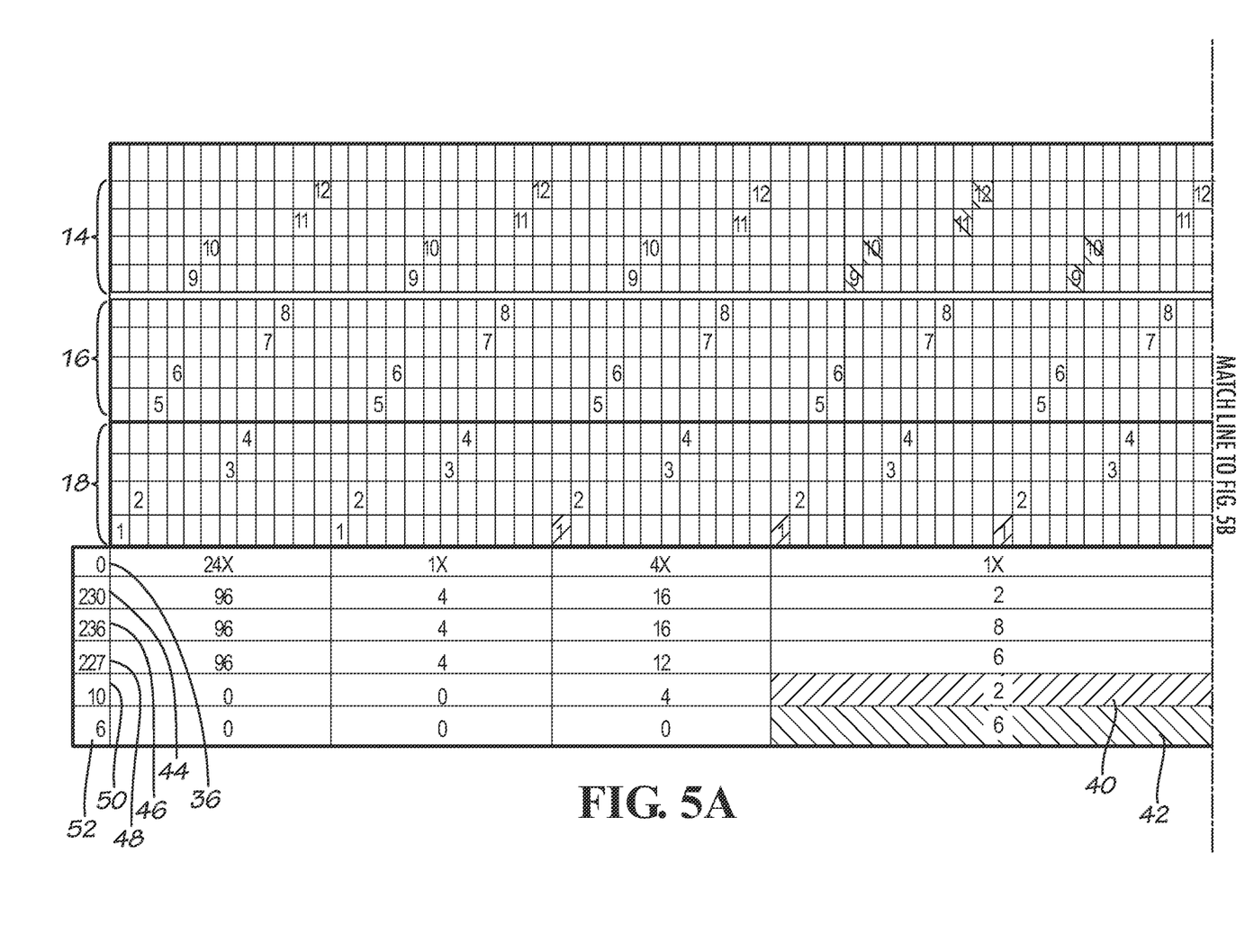
FIGS. 5A-5B show a draw-in diagram of the hose cover of FIG. 1.
Figure 5B:
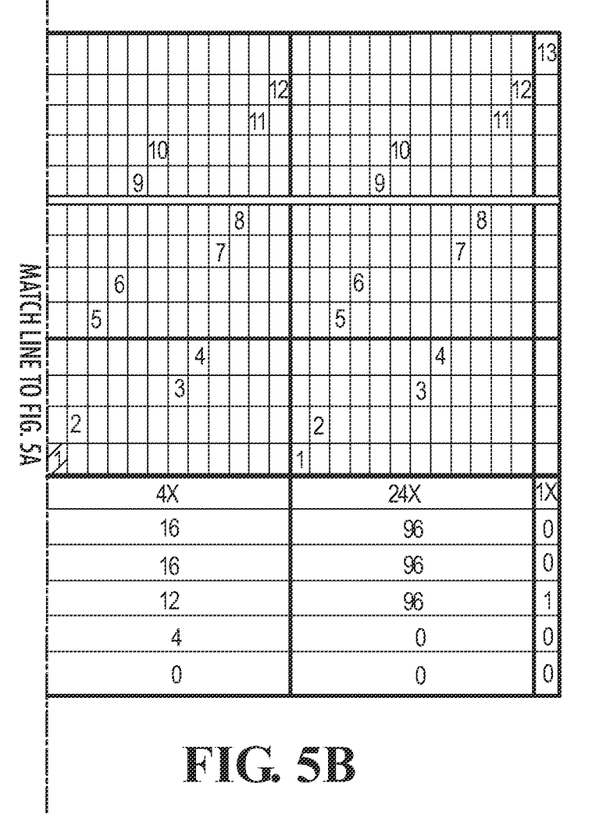

The draw-in diagram of FIGS. 5A-5B shows the placement of the warp yarns 32 in harnesses to produce the hose cover 10 of FIGS. 1-3, while the pick diagram of FIG. 4 represents the action of the harnesses with respect to the weft yarn 34 to create the woven structure. The vertical axis of the draw-in diagram of FIGS. 5A-5B represents the number of harnesses of a loom used to make the hose cover 10. In this embodiment, thirteen harnesses are used. In the embodiment shown in FIGS. 5A-5B, the bottom four harnesses (harnesses 1-4) comprise the warp yarns that form the outer sheath 18, the middle four harnesses (harnesses 5-8) comprise the warp yarns that form the middle sheath 16, and the next four harnesses (harnesses 9-12) comprise the warp yarns that form the inner sheath 14. The top harness (harness 13) comprises the warp yarns that reinforce the edge of the structure, and seal the edge from leakage. The horizontal axis of FIGS. 5A-5B represents the yarns that are used to create the hose cover 10, with row 36 showing the number of times each segment of the diagram repeats. For example, the first column of FIG. 5A illustrates that the first yarn is in the first harness frame, and the second yarn is in the second harness frame. The numbers shown in rows 44, 46, 48, 50, and 52 refer to the end counts for each type of material used, and are used during the loom set up. For example, row 44 specifies the use of a yarn having an end count of 230. In the first segment, the pattern of which is repeated 24 times, the 96 number represents the number of yarns used in that segment for that particular yarn type, while the 4 number represents the number of yarns used in the second segment for that particular yarn type. Alternatively, if only a single color were used in the woven webbing, the complete webbing could be made using only one segment. The structure in the embodiment shown in FIGS. 5A-5B includes several colored yarns. The number of times each pattern repeats can be increased or decreased as the width of the woven structure increases or decreases. The crosshatch illustrated by reference numerals 40 and 42 represents the use of colored yarns as marker yarns in the desired segments. In one embodiment, the hose cover may be formed on a Muller NF loom, but other suitable looms may be used.

With respect to some embodiments, the phrase "weaving pass" includes two pick insertions, with one pick being made in the top layer of one of the sheaths and one pick being made in the bottom layer of the other of the sheaths. Thus, the weft yarn 34 traverses from one layer to the next at each edge of the structure during a weaving pass (i.e., during the course of two pick insertions).

Figure 6:
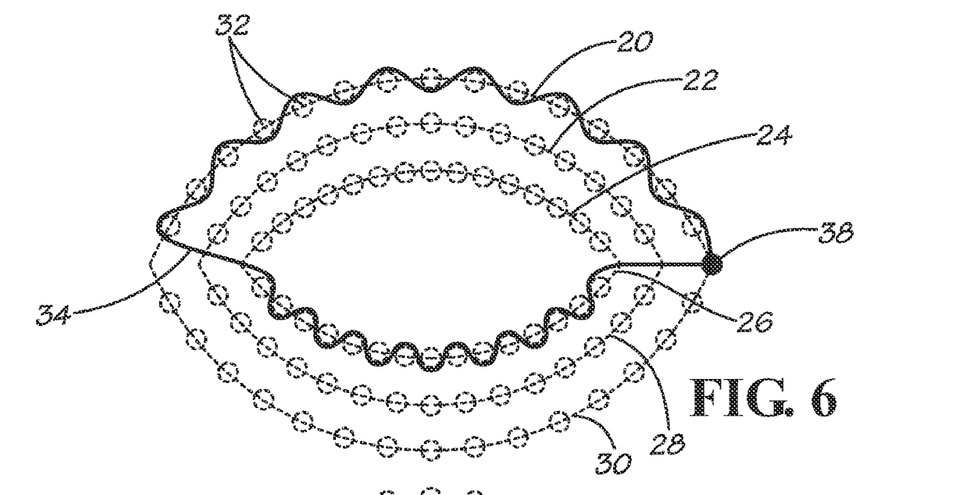
FIGS. 6-11 are cross-sectional views illustrating the weaving pattern of the hose cover of FIG. 1.
Figure 7:
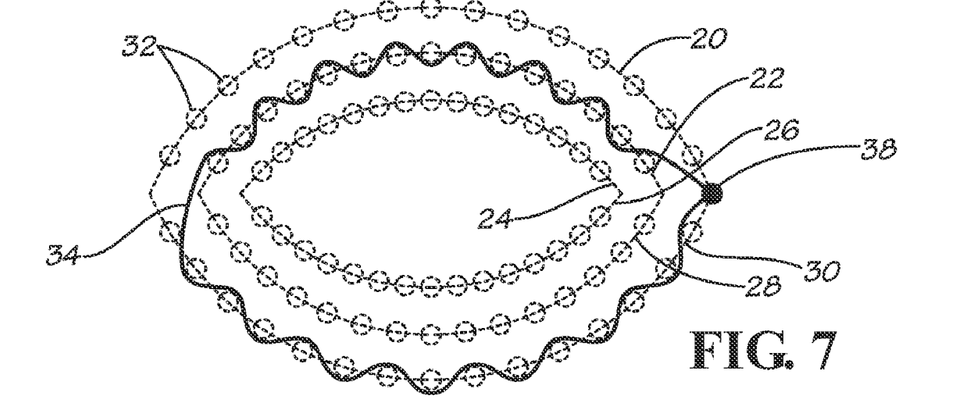
Figure 8:
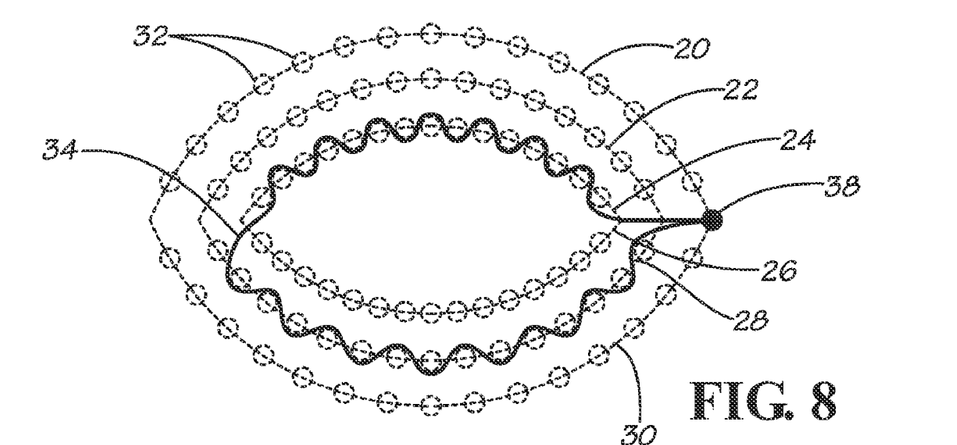
Figure 9:
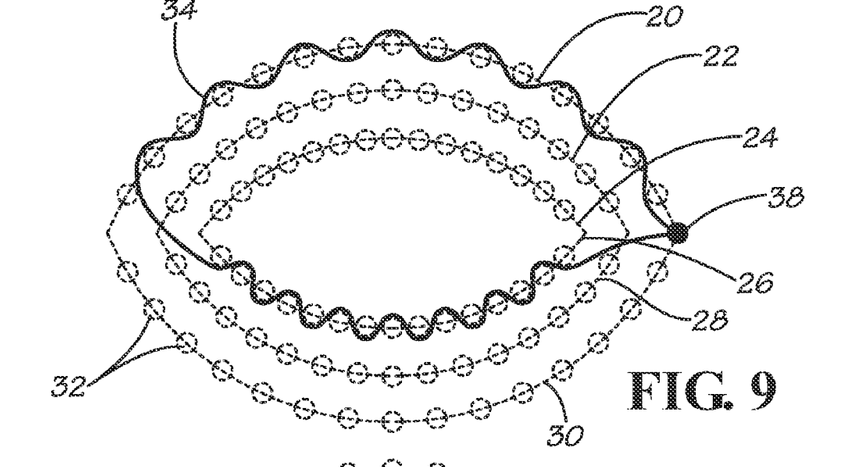
Figure 10:
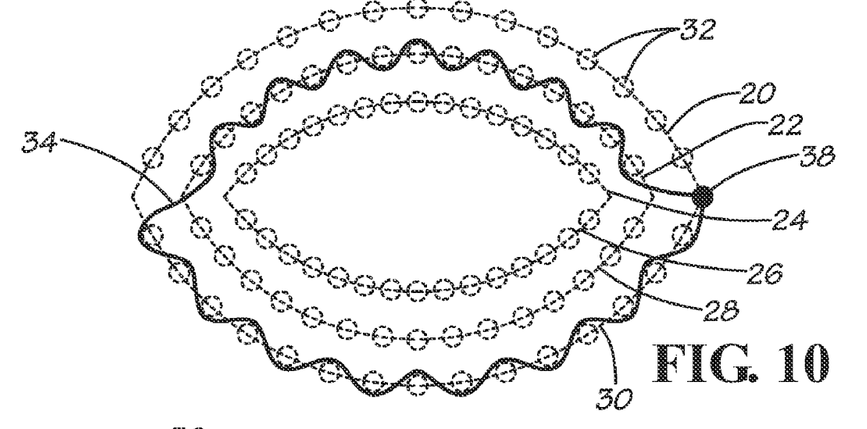
Figure 11:
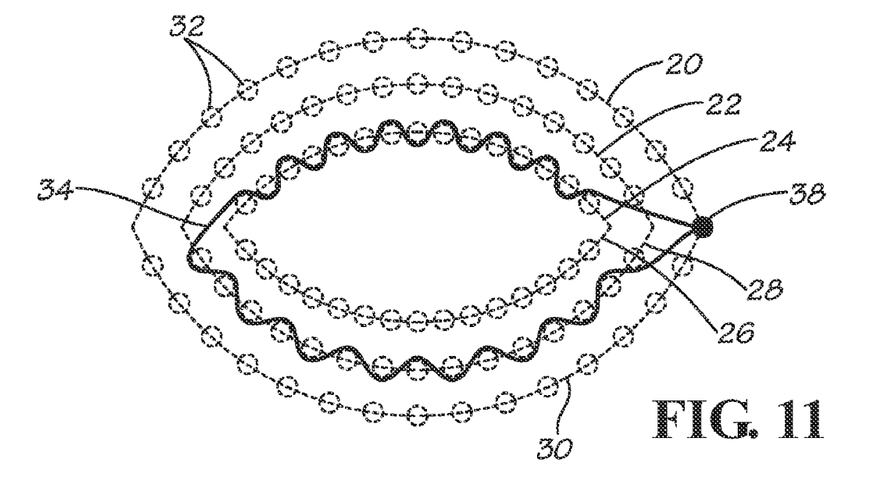
Figure 12:
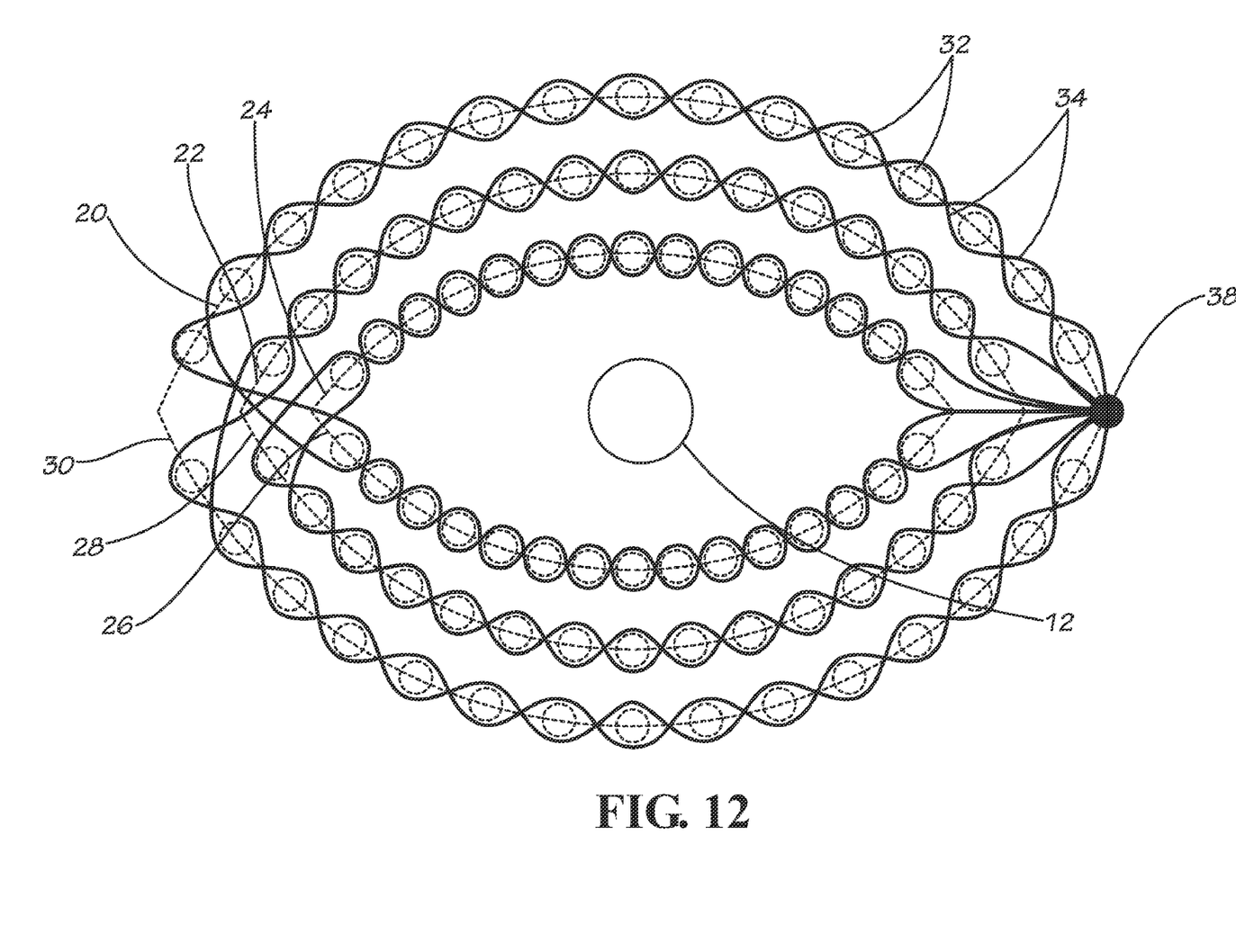
FIG. 12 is a cross-sectional view illustrating the complete weaving pattern of the hose cover of FIG. 1.
Figure 13:
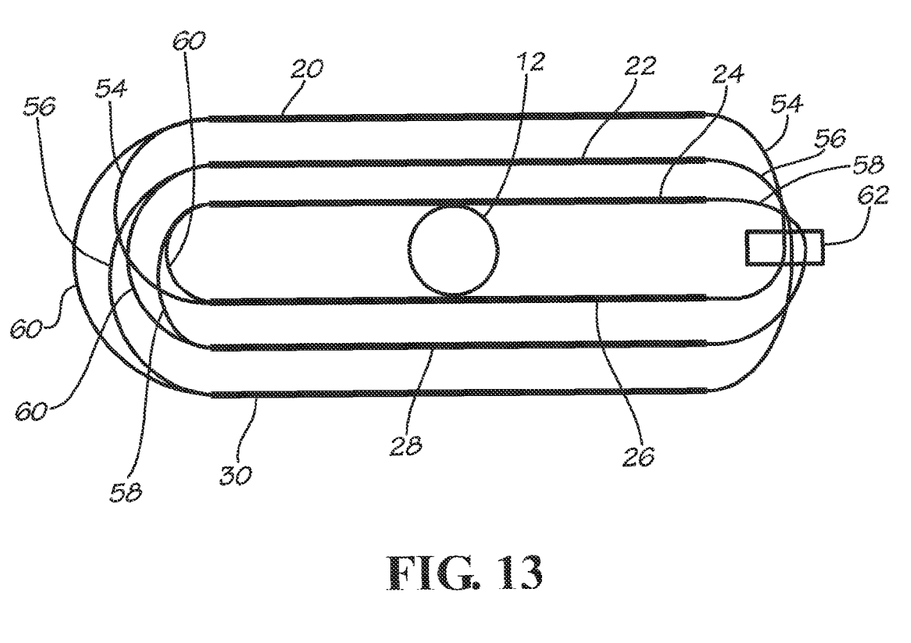
FIG. 13 is a cross-sectional view illustrating the weaving passes of FIGS. 6-12.

FIGS. 6-13 are cross-sectional views of the hose cover 10 showing the weaving pattern of the weft yarn 34 to interweave the various layers together. As shown in FIGS. 6 and 13, during a first weaving pass 54, weft yarn 34 interweaves the first layer 20 with the fourth layer 26 to connect a portion of the outer sheath 18 with a portion of the inner sheath 14. As shown in FIGS. 7 and 13, during a second weaving pass 56, weft yarn 34 interweaves the second layer 22 with the sixth layer 30 to connect a portion of the middle sheath 16 with a portion of the outer sheath 18. As shown in FIGS. 8 and 13, during a third weaving pass 58, weft yarn 34 interweaves the third layer 24 with the fifth layer 28 to connect a portion of the inner sheath 14 with a portion of the middle sheath 16. As shown in FIGS. 9 and 13, during a fourth weaving pass 54, weft yarn 34 interweaves the first layer 20 with the fourth layer 26 to connect a portion of the outer sheath 18 with the inner sheath 14. As shown in FIGS. 10 and 13, during a fifth weaving pass 56, weft yarn 34 interweaves the second layer 22 with the sixth layer 30 to connect a portion of the middle sheath 16 with the outer sheath 30. As shown in FIGS. 11 and 13, during a sixth weaving pass 58, weft yarn 34 interweaves the third layer 24 with the fifth layer 28 to connect a portion of the inner sheath 14 with the middle sheath 16. FIGS. 12-13 illustrate the weaving pattern of the weft yarn 34 of all six layers.

During each of the weaving passes illustrated in FIGS. 6-13, the weft yarn 34 crosses over a crossover point 38 generally located in the center of the structure at the outer edge. Thus, the weft yarn 34 crosses the center of the structure at each weaving pass. This helps maximize the strength of the structure at its edges by placing a greater amount of weft yarn at the crossover point 38. In some embodiments, as shown in FIGS. 12-13, the structure may include a second crossover point on the opposite side of the structure through which the weft yarn 34 passes at each weaving pass.

FIG. 13 illustrates the two crossover points created by the weaving passes of FIGS. 6-11. Reference numeral 54 represents the first and fourth weaving passes (also shown in FIGS. 6 and 9), reference numeral 56 represents the second and fifth weaving passes (also shown in FIGS. 7 and 10), and reference numeral 58 represents the third and sixth weaving passes (also shown in FIGS. 8 and 11). Reference numerals 60 represent the transition from one weaving pass to another. The structure illustrated in FIG. 13 also includes a knitted edge 62.

As shown in FIGS. 4 and 6-11, all layers of the hose cover 10 are formed using a 1/1 weave (that is, a warp yarn 32 goes over weft yarn 34 while the adjacent warp yarn 32 goes under the weft yarn 34). Moreover, in some embodiments, when weaving one of the layers of one of the sheaths to one of the layers of another sheath during a first pass, a first weaving pattern may be used. When weaving the same two layers together during a second pass, the weaving pattern may be reversed. As shown when comparing FIGS. 6 and 9, for instance, the pattern of lifted warp yarns of the first and fourth layers relative to the weft yarn reverses when the weft yarn 34 is thrown on the second pass to interweave these same two layers. In other words, the warp yarns that are lifted during the weaving pass illustrated in FIG. 6 are lowered during the weaving pass illustrated in FIG. 9. However, in other embodiments, other weave patterns may be used.

Although the embodiment described above is a six-layer structure having an outer sheath, a middle sheath, and an inner sheath, the hose cover may comprise any number layers and any number of sheaths interwoven together. In some embodiments, the hose cover has more than six layers, and in other embodiments has less than six layers. Any multilayer hose cover with layers that are interwoven in accordance with the principles described above is included within the scope of the invention.

The specific embodiment of the multilayer hose cover 10 having warp yarns 32 and the weaving pattern described above underwent testing to determine its effectiveness to contain a high pressure hose. According to one embodiment of the present invention, the warp yarns used for the outer sheath 18 are jet textured 2900 denier nylon yarns, which provides increased abrasion protection for the inside layers. The warp yarns used for the middle and inner sheaths 16 and 14 are flat 1680 denier nylon yarns with 2.5 z turns per inch. In one embodiment, the weft yarn 34 for all layers is flat 840 denier nylon yarn. In some embodiments, the third layer 24 and the fourth layer 26 of the inner sheath 14 include a marker yarn to guide the positioning of the hose 12 between those two layers.

In certain embodiments, all six layers have a weft density of 22 picks per inch. In this particular embodiment, the outer sheath 18 has a warp density of 36.7 ends per inch. The fabric weight of the outer sheath 18 is approximately 0.01377 ounces per square inch with a thickness of 0.945 inches. In some embodiments, the inner and middle sheaths 14 and 16 have a warp density of 36.70 ends per inch. The fabric weight is approximately 0.00986 ounces per square inch with a thickness of 0.034 inches. In other embodiments, the weights and thicknesses of the sheaths vary depending on the fabric, denier, and weave-in variation used.

Different materials may be incorporated into the hose cover in different situations. For example, conductive material and/or ultra strength material, such as Kevlar™ or Spectra™ yarns, may be used as needed.

The yarn combination described above provides for a tighter, thinner weave for the inner and middle sheath as compared to the outer sheath, giving the fabric of the inner and middle sheath a lower permeability. The specific embodiment of the hose cover 10 was placed around a hydraulic hose and subjected to burst testing. The fluid pressure in the hose was consistently increased until the hose ruptured inside the hose cover 10. The hose cover 10 remained intact and the energy of the escaping fluid was dissipated and the fluid harmlessly seeped out of the hose cover 10 as desired. Thus, the hose cover 10 described above contained a burst hose of up to at least 13500 psi. A conventional hose cover was subjected to similar testing and was torn by the escaping fluid at the location of the hose failure. Other embodiments having other weaving patterns and/or a different number of layers could contain a burst hose of higher psi.

The hose cover 10 according to the specific embodiment of the invention described above also was subjected to impulse testing to test the hose cover's resistance to pin hole type failures. A small hole having a diameter of approximately 0.049 inches was drilled into the wall of the hydraulic hose and a hose cover was then placed around the hydraulic hose. The fluid pressure inside the hose was cycled to a test pressure of 4000 psi at a rate of 60 cycles per minute with the fluid temperature at 250° F. The hose cover remained intact with fluid seeping through the outer sheath of the hose cover at low energy. Thus, the hose cover 10 described above can be used with equipment that operates at least 4000 psi. A conventional hose cover was subjected to similar testing and the cover was completely penetrated by a jet of fluid exiting from the hole in the hydraulic hose and the jet exited at high pressure. Other embodiments having other weaving patterns and/or a different number of layers could be used with equipment operating at more than 4000 psi.

Thus, the hose cover 10 provides protection against both high energy bursting at high pressure, as well as small holes in the hose that allow high velocity streams to escape. The energy of these types of failures is absorbed by the weave and interweave of the hose cover. Specifically, the various layers reinforce each other and spread the energy of the burst over a larger area of the hose cover 10, which allows the hose cover 10 to contain the energy associated with the burst, while the fluid released by the failure of the hose is allowed to seep through the body of the cover around the area of failure. The outer sheath 18 serves as an abrasion resistant layer while the middle and inner sheaths 16 and 14 are tightly woven to disperse the energy associated with the burst. The pooling of fluid alerts personnel of the house failure without causing injury to personnel from the high energy release of fluid.

While the invention has been particularly shown and described with reference to preferred embodiments thereof, it will be understood by those skilled in the art that various changes in form and details may be made therein without departing from the spirit of the invention.

What is claimed is:

1. A multilayer hose cover comprising:
    a plurality of sheaths each comprising a top layer and a bottom layer, wherein each of the top and bottom layers of the plurality of sheaths comprise a plurality of warp yarns that extend in a generally longitudinal direction, and wherein the plurality of sheaths comprises an innermost sheath;
    a weft yarn that is:
        (i) interwoven between only the plurality of warp yarns of the top layer of a first of the plurality of sheaths along a first section of the hose cover;
        (ii) interwoven between only the plurality of warp yarns of the bottom layer of a second of the plurality of sheaths along a second section of the hose cover;
        (iii) interwoven between the plurality of warp yarns of at least the top layer of the first of the plurality of sheaths and the bottom layer of the second of the plurality of sheaths in a pattern such that the weft yarn is shared between the top layer of the first of the plurality of sheaths and the bottom layer of the second of the plurality of sheaths along at least one of a first connection section or a second connection section of the sheath; and
        (iv) interwoven between the bottom layer of the first of the plurality of sheaths and at least one of the top layers of another of the plurality of sheaths in a pattern such that the weft yarn is shared between the bottom layer of the first of the plurality of sheaths and one of the top layers of another of the plurality of sheaths along at least one of the first connection section or the second connection section, wherein the first connection section includes at least one warp yarn from a first end of each of the layers and wherein the second connection section includes at least one warp yarn from a second end of each of the layers; and
    an opening to receive a hose that is positioned between the first and the second layers of the innermost sheath.

2. The multilayer hose cover of claim 1, wherein the weft yarn interweaves the plurality of sheaths together in such a way that the hose cover is capable of withstanding up to at least a 4000 psi pin hole leak or a mass fluid ejection burst of up to at least 4000 psi.

3. The multilayer hose cover of claim 1, wherein the plurality of sheaths comprises an outer sheath, a middle sheath, and an inner sheath.

4. The multilayer hose cover of claim 1, further comprising at least one crossover point located within at least one of the first or the second connection sections and through which the weft yarn crosses such that the plurality of sheaths are all connected together at the at least one crossover point.

5. The multilayer hose cover of claim 1, wherein at least one of the plurality of sheaths further comprises a marker yarn.

6. The multilayer hose cover of claim 1, wherein at least one of the plurality of sheaths is formed of an abrasion resistant material.

7. A hose cover having a plurality of layers comprising:
a first layer and a sixth layer that together form an outer sheath having a plurality of warp yarns that extend in a generally longitudinal direction, wherein the first layer comprises a first section of the hose cover and the sixth layer comprises a sixth section of the hose cover;
a second layer and a fifth layer that together form a middle sheath having a plurality of warp yarns that extend in a generally longitudinal direction, wherein the second layer comprises a second section of the hose cover and the fifth layer comprises a fifth section of the hose cover;
a third layer and a fourth layer that together form an inner sheath having a plurality of warp yarns that extend in a generally longitudinal direction, wherein the third layer comprises a third section of the hose cover and the fourth layer comprises a fourth section of the hose cover;
wherein a weft yarn interweaves the first, second, third, fourth, fifth, and sixth layers together only at a first connection section and at a second connection section;
wherein the first, second, third, fourth, fifth, and sixth layers are separate from one another along the first section, the second section, the third section, the fourth section, the fifth section, and the sixth section; and
wherein the first connection section includes at least one warp yarn from a first end of each of the layers and wherein the second connection section includes at least one warp yarn from a second end of each of the layers.

8. The hose cover of claim 7, wherein the weft yarn interweaves the layers together in such a way that the hose cover is capable of withstanding up to at least a 4000 psi pin hole leak or a mass fluid ejection burst of up to at least 4000 psi.

9. The hose cover of claim 7, wherein the weft yarn is shared between the first layer and the sixth layer of the outer sheath, the second layer and the fifth layer of the middle sheath, and the third layer and the fourth layer of the inner sheath.

10. The hose cover of claim 7, further comprising at least one crossover point through which the weft yarn crosses such that the first layer, the second layer, the third layer, the fourth layer, the fifth layer, and the sixth layer are connected together at the crossover point, wherein the crossover point is located within at least one of the first or the second connection sections.

11. The hose cover of claim 7, further comprising an opening to receive a hose that is positioned between the third layer and the fourth layer.

12. The hose cover of claim 7, wherein:
the weft yarn passes from the first layer directly to the fourth layer within at least one of the first or second connection sections to interweave these layers together along that connection section;
the weft yarn passes from the second layer directly to the sixth layer within at least one of the first or second connection sections to interweave these layers together along that connection section; and
the weft yarn passes from the third layer directly to the fifth layer within at least one of the first or second connection sections to interweave these layers together along that connection section.

13. The hose cover of claim 7, wherein at least one of the layers of one of the sheaths is interwoven with at least one of the layers of another one of the sheaths using the weft yarn in a first weaving pattern and the at least one of the layers of one of the sheaths is interwoven with at least one of the layers of another one of the sheaths in a second weaving pattern, wherein the second weaving pattern is the reverse of the first weaving pattern.

14. A hose cover having a plurality of layers comprising:
a first layer comprising a first section and a sixth layer comprising a sixth section that together form an outer sheath having a plurality of warp yarns that extend in a generally longitudinal direction;
a second layer comprising a second section and a fifth layer comprising a fifth section that together form a middle sheath having a plurality of warp yarns that extend in a generally longitudinal direction;
a third layer comprising a third section and a fourth layer comprising a fourth section that together form an inner sheath having a plurality of warp yarns that extend in a generally longitudinal direction;
wherein a weft yarn is interwoven with the warp yarns of the first layer and the warp yarns of the fourth layer along at least one of a first connection section or a second connection section to connect only a portion of the outer sheath with only a portion of the inner sheath;
wherein, the weft yarn is interwoven with the warp yarns of the second layer and the warp yarns of the sixth layer along at least one of the first or the second connection sections to connect only a portion of the middle sheath with only a portion of the outer sheath;
wherein, the weft yarn is interwoven with the warp yarns of the third layer and the warp yarns of the fifth layer along at least one of the first or the second connection sections to connect only a portion of the inner sheath with only a portion of the middle sheath;
wherein the first connection section includes at least one warp yarn from a first end of each of the layers and wherein the second connection section includes at least one warp yarn from a second end of each of the layers, and
wherein none of the layers is connected to any other layer along each of the first section, the second section, the third section, the fourth section, the fifth section, and the sixth section.

15. The hose cover of claim 14, further comprising at least one crossover point through which the weft yarn crosses such that the inner sheath, the middle sheath, and the outer sheath are all connected together at the crossover point, wherein the crossover point is located in at least one of the first connection section or the second connection section.

16. The hose cover of claim 14, wherein at least one of the layers of one of the sheaths is interwoven with at least one of the layers of another one of the sheaths using the weft yarn in a first weaving pattern and the at least one of the layers of one of the sheaths is interwoven with at least one of the layers of another one of the sheaths in a second weaving pattern, wherein the second weaving pattern is the reverse of the first weaving pattern.

17. The hose cover of claim 14, wherein the hose cover is configured to withstand up to at least a 4000 psi pin hole leak or a mass fluid ejection burst of up to at least 4000 psi.

18. The hose cover of claim 14, further comprising an opening to receive a hose that is positioned between the third layer and the fourth layer.

19. The hose cover of claim 14, wherein at least one of the third layer and the fourth layer further comprise a marker yarn.

20. The hose cover of claim 14, wherein the outer sheath is formed of an abrasion resistant material.

* * * * *